UNITED STATES PATENT OFFICE.

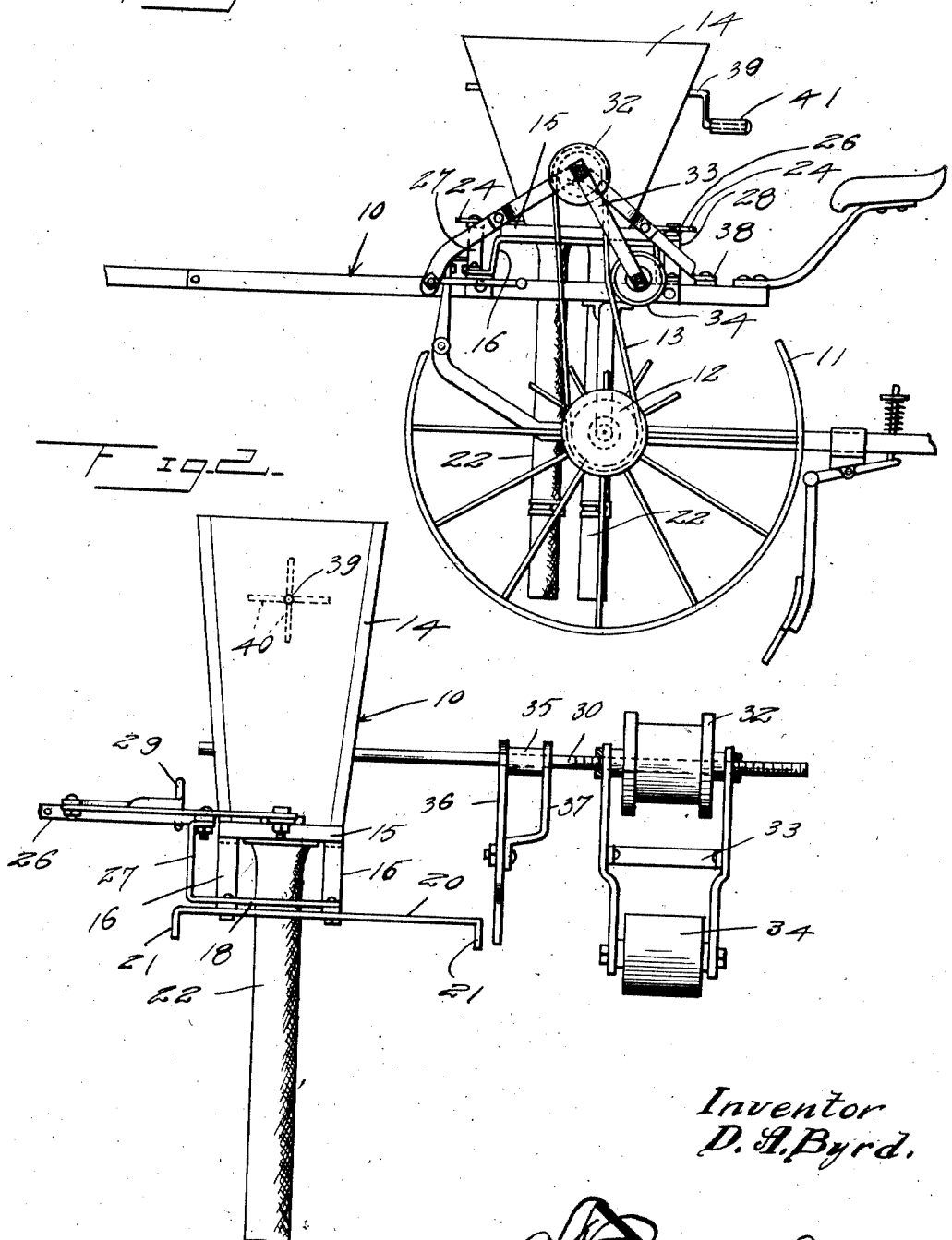

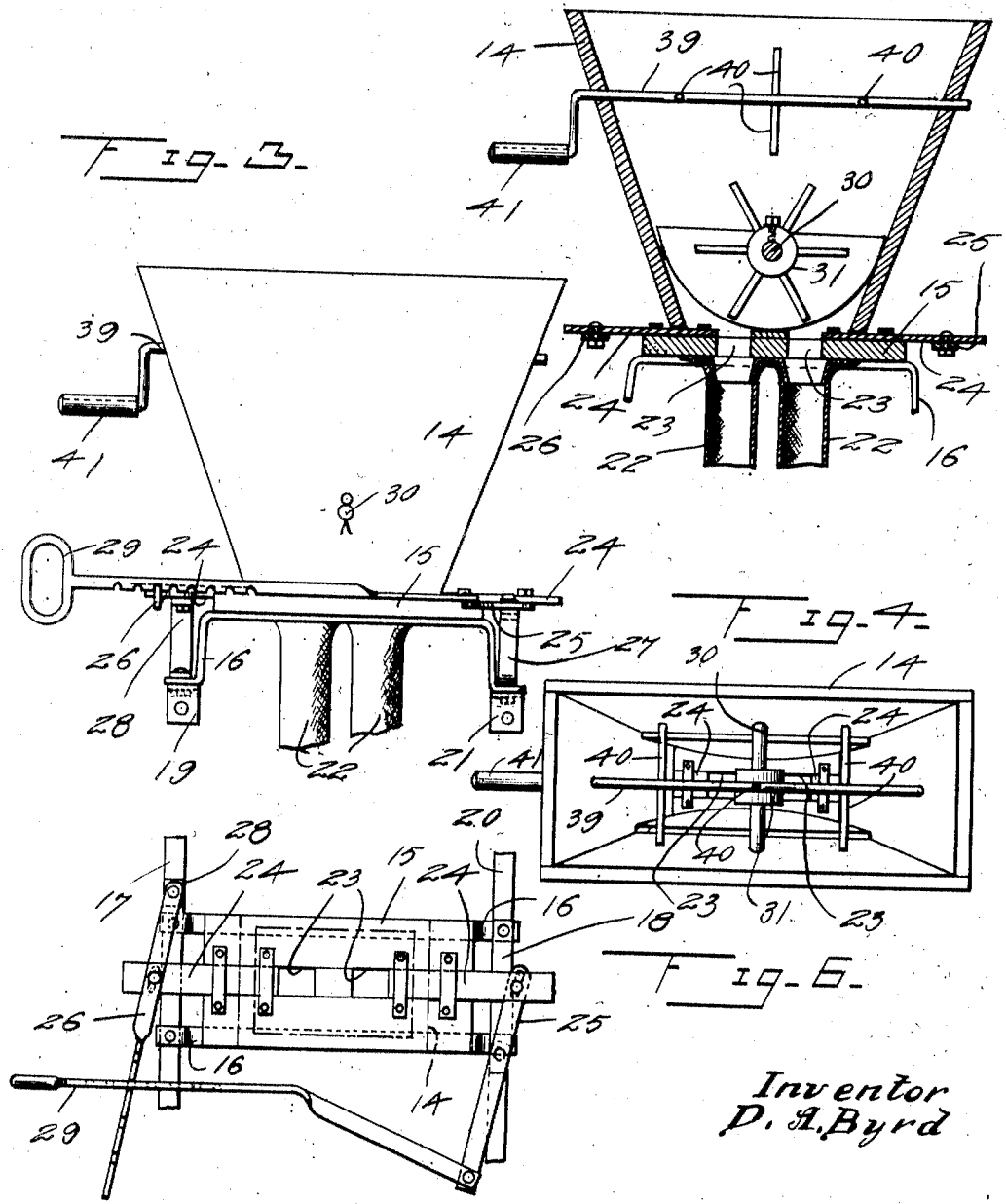
D. A. BYRD.
CULTIVATOR ATTACHMENT
APPLICATION FILED JULY 7, 1919.
1,334,223.
Patented Mar. 16, 1920.
2 SHEETS—SHEET 2.
Inventor
D. A. Byrd

DAVID A. BYRD, OF CLINTON, NORTH CAROLINA.

CULTIVATOR ATTACHMENT.

1,334,223.  Specification of Letters Patent.  Patented Mar. 16, 1920.

Application filed July 7, 1919. Serial No. 308,995.

*To all whom it may concern:*

Be it known that I, DAVID A. BYRD, a citizen of the United States, residing at Clinton, in the county of Sampson and State of North Carolina, have invented certain new and useful Improvements in Cultivator Attachments; and I do hereby declare the following to be a full, clear, and exact description of the invention, such as will enable others skilled in the art to which it appertains to make and use the same.

This invention relates to an improved cultivator attachment consisting of a fertilizer distributer and the main object of the invention is to provide an attachment of the character described so constructed that it may be readily connected with a two-horse cultivator of a conventional riding type thereby permitting the device to be connected with a cultivator when it is desired to fertilize a field and disconnect the fertilizer distributer when it is desired to use the cultivator without the attachment. This permits of the device being transferred from one cultivator to another and further permits of the device being sold as a separate article and put in place upon a cultivator already in use.

Another object of the invention is to so construct this attachment that it may be firmly seated upon the cultivator when in use and the shaft of the feeding wheel in the hopper rotated through the medium of a belt passed about pulleys carried by the shaft and one of the cultivator wheels.

Another object of the invention is to provide improved feed control plates or valve strips and improved actuating means for these strips whereby the strips may be opened the desired amount according to adjustment of the actuating means and the strips caused to open and close together when the actuating handle is moved in the proper direction.

Another object of the invention is to so construct this attachment that it will be very efficient in operation and comparatively simple in construction and not liable to easily break or get out of order.

This invention is illustrated in the accompanying drawings, wherein:

Figure 1 is a side elevation of a two-horse riding cultivator of a conventional construction having the attachment connected therewith.

Fig. 2 is an enlarged view showing the attachment in front elevation.

Fig. 3 is a side elevation of the attachment.

Fig. 4 is a top plan view of the hopper.

Fig. 5 is a vertical sectional view of the attachment taken longitudinally of the hopper.

Fig. 6 is a perspective view of the hopper support and valve strip actuating mechanism carried thereby.

The fertilizer distributing attachment is for use in connection with a cultivator indicated in general by the numeral 10 and provided with supporting wheels 11, at the hub portion of one of which will be secured the pulley 12 for transmitting motion to the driving shaft of the attachment through the medium of the belt 13. This cultivator is of a conventional construction and therefore a detail description of the same is not necessary.

The hopper 14 of the attachment is provided with a bottom 15 which rests upon and is bolted to the U-shaped supporting yoke 16 the depending legs of which will be releasably connected with cross strips 17 and 18 through the medium of bolts or other releasable fasteners. This cross strip 17 is secured beneath the outturned feet of the depending legs at one side of the hopper and has its end portion bent to provide ears 19 by means of which the cross strip may be connected with the frame of the cultivator, and the cross strip 18 is secured to the upper faces of the feet at the opposite side of the hopper, the bolts which releasably connect the strip 18 serving also to hold a supporting bar 20 in place. The end portions of this supporting bar 20 are bent to provide attaching ears 21 by means of which the bar may be connected with the cultivator frame. It will thus be seen that the hopper support will be releasably connected with the cultivator frame and can be removed when desired. Outlet spouts 22, which are in the form of hose, are secured beneath the bottom of the hopper about the outlet openings 23 formed therein and extend downwardly through the body of the cultivator to a point adjacent the ground thereby permitting the fertilizer in the hopper to be deposited upon the ground and then worked into the ground by the cultivator teeth or shovels.

In order to control the passage of the fertilizer out of the hopper there has been provided plates or valve strips 24 which are slidably mounted in cutouts formed in the bottom of the hopper and when moved inwardly will cover the outlet openings 23 and prevent passage of the fertilizer through the spouts 22. In order to provide means for actuating the valve strips and retain the valve strips at the desired point when open, there has been provided levers 25 and 26, the lever 25 having its end portion loosely connected with its valve strip 24 and the lever 26 being loosely connected with its valve strip 24 at a point intermediate the length of the lever. The lever 25 is pivotally mounted intermediate its length upon the upturned end portion 27 of the strip or bar 18 and the lever 26 is pivotally connected at its end with the upturned end portion of the supporting bracket strip 28. It will thus be seen that if the free end portions of the levers are swung in a common direction, the valve will be simultaneously opened or closed according to the direction in which the levers are moved. The actuating handle 29 is loosely connected with the free end portion of the lever 25 and extends across the lever 26, the contacting edge portions of the handle and lever 26 being provided with notches for interlocking engagement thereby permitting the lever 26 to be secured upon the handle at the desired spaced distance from the lever 25. Therefore, the two levers may be set to leave the outlet opening of the hopper open the desired amount. When the lever is actuated through the medium of the handle, the outlet openings will either be closed or opened. With this construction it is not necessary to carefully watch the machine when opening the valves after temporarily closing them in order to be sure that the valves are not open beyond a desired amount as they can only be opened a certain amount when the adjustment of the handle is made and therefore they may be opened to the full extent permitted.

In order to agitate the powdered fertilizer and thus permit the same to feed freely through the outlet openings in the bottom of the hopper, there has been provided a shaft 30 which extends through the hopper and carries an agitating wheel 31 which serves to agitate the powdered fertilizer in the lower portion of the hopper. Therefore, the fertilizer will not tend to cling together and thus fail to pass out freely through the outlet opening. This shaft 30 carries a pulley 32 about which the belt 13 passes and it will thus be seen that the shaft will be rotated from the supporting wheel of the cultivator through the medium of the belt. A bracket 33 is pivotally mounted upon the shaft 30 and carries a roller 34 to engage the belt thus providing a belt tightener which will engage one flight of the belt and serve to keep the belt at the proper tightness. In order to support the shaft there has been provided a bracket having a bearing sleeve 35 through which the shaft 30 passes, the sleeve carrying arms 36 and 37 which extend downwardly from the sleeve in diverging relation. The arms 37 are carried to and connected with the arms 36 and the end portions of the arms 36 are bent to provide feet 38 through which releasable fasteners pass to releasably connect the bearing bracket with the frame of the cultivator. If the fertilizer should become damp while in use it might tend to stick together and thus form a cake in the upper portion of the hopper which could not be effectively broken up by the agitating wheel mounted upon the shaft within the lower portion of the hopper and in order to break up this cake there has been provided a shaft 39 which is journaled in the walls of the hopper and extend through the same at right angles to the shaft 30. This shaft 39 carries fingers 40 which will serve to break up the cake in the upper portion of the hopper when the shaft 39 is rotated through the medium of the handle 41.

When in use the fertilizer feeding attachment will be connected with the cultivator frame as shown and the belt 13 will be placed about the pulley wheel 12 connected with one of the supporting wheels of the cultivator. The machine will then be driven to the field where it is to be used and proper adjustment of the valve strip made to open the outlet opening the desired amount. The machine will then be driven across the field and as it moves across the field the fertilizer will be fed through the spout or hose 22 and will be deposited upon the ground. This fertilizer will then be mixed with the ground by the action of the cultivator blades. When making a turn at the end of a field it would not be desirable to have the fertilizer deposited upon the ground and therefore when reaching the end of the field the handle will be moved to rock the levers 25 and 26 thus closing the outlet opening. After the turn is made the handle will be moved in the opposite direction thus swinging the levers to open the valve. As previously stated, the adjustment of the levers and handle will only permit the valve to open the desired amount and therefore it is not necessary to examine the machine to see if the proper amount of fertilizer is feeding. When it is no longer desired to use the fertilizer attachment, it can be easily and quickly removed and either put away until again to be used or transferred to another machine upon which it may be desired to use the attachment. There has therefore been provided a fertilizer attachment for a cultivator which can be connected with cultivators of a standard construction and which will be very efficient in operation.

What is claimed is:

1. A hopper having a bottom provided with outlet openings, a supporting frame for the hopper, levers pivotally connected with the supporting frame, valve strips slidably connected with the bottom of the hopper for closing the outlet openings formed therein, the strips being pivotally connected with the levers and moving to open and close the outlet openings when the levers are moved, and an actuating handle loosely connected with one lever and adapted to be releasably connected with the second lever whereby movement of the actuating handle will simultaneously impart movement to the levers to open or close the outlets at the bottom of the hopper.

2. A hopper having outlets at the bottom thereof, a supporting frame for the hopper, valve plates for closing the openings in the bottom of the hopper, actuating levers, one being pivotally connected intermediate its length with its valve plate and having its end portion pivotally connected with the supporting frame and the second being pivotally mounted intermediate its length upon the frame and having one end portion pivotally connected with its valve plate, and an actuating handle for moving the levers extending transverse thereof and loosely connected with one lever and releasably engaging the second lever whereby the levers may be retained in a predetermined spaced relation for limiting closing of the valves.

3. A hopper, a supporting frame for the hopper, valve plates movably connected with the hopper for closing outlet openings formed in the bottom thereof, actuating levers for the valves, and a handle for imparting movement to the actuating levers loosely connected with one lever and releasably engaging the second lever to releasably retain the levers in a predetermined spaced relation.

In testimony whereof I affix my signature in presence of two witnesses.

DAVID A. BYRD.

Witnesses:
WILLIAM PETERSON,
KING E. BYRD.